United States Patent
Saliba

(10) Patent No.: US 7,649,707 B2
(45) Date of Patent: Jan. 19, 2010

(54) AUTO-SERVO TAPE SYSTEM AND ASSOCIATED RECORDING HEAD

(75) Inventor: George A. Saliba, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 12/047,221

(22) Filed: Mar. 12, 2008

(65) Prior Publication Data

US 2008/0198503 A1 Aug. 21, 2008

Related U.S. Application Data

(63) Continuation of application No. 11/084,412, filed on Mar. 18, 2005, now Pat. No. 7,499,235.

(51) Int. Cl.
G11B 21/02 (2006.01)
G11B 5/09 (2006.01)
G11B 5/584 (2006.01)

(52) U.S. Cl. .................. 360/75; 360/48; 360/77.12

(58) Field of Classification Search ............ 360/75, 360/48, 77.12
See application file for complete search history.

(56) References Cited

U.S. PATENT DOCUMENTS

| | | | |
|---|---|---|---|
| 2,937,239 A | 5/1960 | Garber, Jr. at al. | |
| 3,633,038 A | 1/1972 | Falk | |
| 3,829,895 A | 8/1974 | Tanaka et al. | |
| 3,919,697 A | 11/1975 | Walker | |
| 3,971,002 A | 7/1976 | Bricot et al. | |
| 4,056,830 A | 11/1977 | Smith | |
| 4,110,799 A | 8/1978 | Bergmans et al. | |

(Continued)

FOREIGN PATENT DOCUMENTS

EP 0 162 349 A2 11/1985

(Continued)

OTHER PUBLICATIONS

European Search Report mailed on Nov. 15, 2007, for EP Patent Application No. 04 256 407.0, filed Oct. 19, 2007, 4 pages.

(Continued)

*Primary Examiner*—Daniell L Negrón

(57) ABSTRACT

A recording head comprises a first tape-head contact area including a first write element and a first read element, which itself may include an MR sensor element. The first read element is laterally offset as to the first write element, and no portion of the first read element lies in a region laterally overlapped by the first write element. A second tape-head contact area includes a second write element and a second read element, which also may include an MR sensor element. The second read element is laterally offset as to the second write element, and no portion of the second read element lies in a region laterally overlapped by the second write element. The first read and write elements of the first tape-head contact area are aligned with the second write and read elements of the second tape-head contact area so that an end portion of the second write element lies in a region that laterally overlaps only an end portion of the first write element. Data track widths less than one micron are achievable with this head design.

2 Claims, 10 Drawing Sheets

U.S. PATENT DOCUMENTS

| | | | |
|---|---|---|---|
| 4,149,204 A | 4/1979 | Marino et al. | |
| 4,176,381 A | 11/1979 | De Niet et al. | |
| 4,321,634 A | 3/1982 | Lehureau | |
| 4,334,252 A | 6/1982 | Toriu | |
| 4,392,163 A | 7/1983 | Rijckaert et al. | |
| 4,414,589 A | 11/1983 | Oliver et al. | |
| 4,422,112 A | 12/1983 | Tanaka | |
| 4,424,541 A | 1/1984 | Koinuma et al. | |
| 4,439,793 A | 3/1984 | Nater | |
| 4,449,082 A | 5/1984 | Webster | |
| 4,472,750 A | 9/1984 | Klumpp et al. | |
| 4,479,156 A | 10/1984 | Kumagai et al. | |
| 4,502,082 A | 2/1985 | Ragle et al. | |
| 4,539,615 A | 9/1985 | Arai et al. | |
| 4,551,777 A * | 11/1985 | Saito et al. | 360/77.11 |
| 4,679,104 A | 7/1987 | Dahlerud | |
| 4,685,005 A | 8/1987 | Fields, Jr. | |
| 4,802,030 A | 1/1989 | Henry et al. | |
| 4,816,939 A | 3/1989 | Ford et al. | |
| 4,823,205 A | 4/1989 | Hannon et al. | |
| 4,866,548 A | 9/1989 | Rudi | |
| 4,975,791 A | 12/1990 | Eggebeen | |
| 4,979,051 A | 12/1990 | Eggebeen | |
| 5,050,017 A | 9/1991 | Carr et al. | |
| 5,055,959 A | 10/1991 | Saliba | |
| 5,072,319 A | 12/1991 | Kohri et al. | |
| 5,121,270 A | 6/1992 | Alcudia et al. | |
| 5,126,895 A | 6/1992 | Yasuda et al. | |
| 5,132,861 A | 7/1992 | Behr et al. | |
| 5,196,969 A | 3/1993 | Iwamatsu et al. | |
| 5,257,148 A | 10/1993 | Solhjell et al. | |
| 5,262,908 A | 11/1993 | Iwamatsu et al. | |
| 5,285,331 A | 2/1994 | White | |
| 5,289,328 A | 2/1994 | Saliba | |
| 5,294,791 A | 3/1994 | Pahr | |
| 5,294,803 A | 3/1994 | Pahr | |
| 5,321,570 A | 6/1994 | Behr et al. | |
| 5,371,638 A | 12/1994 | Saliba | |
| 5,426,551 A | 6/1995 | Saliba | |
| 5,448,430 A | 9/1995 | Bailey et al. | |
| 5,452,152 A | 9/1995 | Rudi | |
| 5,483,392 A | 1/1996 | Ishida | |
| 5,488,519 A | 1/1996 | Ishida et al. | |
| 5,523,904 A | 6/1996 | Saliba | |
| 5,563,868 A | 10/1996 | Farnsworth et al. | |
| 5,588,007 A | 12/1996 | Ma | |
| 5,600,500 A | 2/1997 | Madsen et al. | |
| 5,600,505 A | 2/1997 | Ayres | |
| 5,617,269 A | 4/1997 | Gordenker et al. | |
| 5,680,269 A | 10/1997 | Georgis et al. | |
| 5,757,575 A | 5/1998 | Hallamesek et al. | |
| 5,796,537 A | 8/1998 | Goker et al. | |
| 5,815,337 A | 9/1998 | Milo | |
| 5,844,814 A | 12/1998 | Chliwnyj et al. | |
| 5,847,892 A | 12/1998 | Goker | |
| 5,862,014 A | 1/1999 | Nute | |
| 5,940,238 A | 8/1999 | Nayak et al. | |
| 5,949,604 A | 9/1999 | Saliba | |
| 5,973,872 A | 10/1999 | Saliba | |
| 5,973,874 A | 10/1999 | Panish et al. | |
| 5,978,188 A | 11/1999 | Kaaden et al. | |
| 5,982,711 A | 11/1999 | Knowles et al. | |
| 6,005,737 A | 12/1999 | Connolly et al. | |
| 6,018,434 A | 1/2000 | Saliba | |
| 6,061,199 A | 5/2000 | Goker et al. | |
| 6,075,678 A | 6/2000 | Saliba et al. | |
| 6,084,740 A | 7/2000 | Leonhardt et al. | |
| 6,088,184 A | 7/2000 | Hu | |
| 6,108,159 A * | 8/2000 | Nute et al. | 360/77.12 |
| 6,118,605 A | 9/2000 | Call et al. | |
| 6,128,155 A | 10/2000 | Sugawara et al. | |
| 6,130,792 A | 10/2000 | Goker | |
| 6,134,072 A | 10/2000 | Zweighaft | |
| 6,141,174 A | 10/2000 | Judge et al. | |
| 6,166,874 A | 12/2000 | Kim | |
| 6,185,063 B1 | 2/2001 | Cameron | |
| 6,188,532 B1 | 2/2001 | Albrecht et al. | |
| 6,222,698 B1 | 4/2001 | Barndt et al. | |
| 6,236,529 B1 | 5/2001 | Leonhardt et al. | |
| 6,239,939 B1 | 5/2001 | Bui et al. | |
| 6,246,535 B1 | 6/2001 | Saliba et al. | |
| 6,275,349 B1 | 8/2001 | Smith | |
| 6,275,350 B1 | 8/2001 | Barndt | |
| 6,285,519 B1 | 9/2001 | Goker | |
| 6,307,718 B1 | 10/2001 | Kasetty | |
| 6,331,920 B1 | 12/2001 | Albrecht et al. | |
| 6,339,522 B1 | 1/2002 | Hoelsaeter et al. | |
| 6,366,422 B1 | 4/2002 | Daniel et al. | |
| 6,433,951 B1 | 8/2002 | Lubratt | |
| 6,493,174 B1 | 12/2002 | Stubbs | |
| 6,512,651 B1 | 1/2003 | Eifert et al. | |
| 6,535,280 B1 | 3/2003 | La Fontaine et al. | |
| 6,545,837 B1 | 4/2003 | Tran | |
| 6,570,731 B2 | 5/2003 | Burke et al. | |
| 6,700,729 B1 | 3/2004 | Beck et al. | |
| 6,710,967 B2 * | 3/2004 | Hennecken et al. | 360/77.12 |
| 6,768,608 B2 | 7/2004 | Saliba et al. | |
| 6,775,083 B2 | 8/2004 | Hilla, Jr. et al. | |
| 6,775,092 B2 | 8/2004 | Zweighaft et al. | |
| 6,795,267 B2 | 9/2004 | Jewett et al. | |
| 6,801,383 B2 | 10/2004 | Zweighaft et al. | |
| 6,839,196 B2 | 1/2005 | Trivedi | |
| 6,856,484 B2 | 2/2005 | Johnson et al. | |
| 7,085,095 B2 | 8/2006 | Saliba et al. | |
| 7,102,845 B2 | 9/2006 | Saliba et al. | |
| 7,116,514 B2 | 10/2006 | Mahnad et al. | |
| 7,136,255 B2 | 11/2006 | Mahnad et al. | |
| 7,139,152 B2 | 11/2006 | Mahnad et al. | |
| 7,149,050 B2 | 12/2006 | Saliba et al. | |
| 7,184,233 B2 | 2/2007 | Zweighaft | |
| 2006/0209450 A1 | 9/2006 | Saliba | |

FOREIGN PATENT DOCUMENTS

| | | |
|---|---|---|
| EP | 0 162 349 A3 | 11/1985 |
| EP | 0 450 629 A1 | 10/1991 |
| EP | 0 450 629 B1 | 10/1991 |
| EP | 0 854 471 A1 | 7/1998 |
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |
| JP | 60-261083 A | 12/1985 |
| JP | 6-1107 A | 1/1986 |
| JP | 62-217453 | 9/1987 |
| JP | 3-116412 A | 5/1991 |
| JP | 3-290816 A | 12/1991 |
| JP | 4-109421 A | 4/1992 |
| JP | 4-301212 A | 10/1992 |
| JP | 11-259836 A2 | 9/1999 |
| JP | 2002-537623 A | 11/2002 |
| JP | 2003-196812 A | 7/2003 |
| WO | WO-00/49607 | 8/2000 |

OTHER PUBLICATIONS

Klaasen, K.B. (Nov. 1983). "Capacitive Servo Detector," *IBM Technical Disclosure Bulletin* 26(6): 2942-2946.

Potter, R.I. (Nov. 1, 1978). "Capacitive Servoing on Topographic Variations," *IBM Technical Disclosure Bulletin* 21(6): 2506.

Non-Final Office Action mailed on May 1, 2007, for U.S. Appl. No. 11/084,412, filed Mar. 18, 2005, 8 pages.

Amendment in Response to Non-Final Office Action mailed on Jun. 29, 2007, for U.S. Appl. No. 11/084,412, filed Mar. 18, 2005, 12 pages.

Non-Final Office Action mailed on Oct. 30, 2007, for U.S. Appl. No. 11/084,412, filed Mar. 18, 2005, 9 pages.

Amendment in Response to Non-Final Office Action mailed on Jan. 16, 2008, for U.S. Appl. No. 11/084,412, filed Mar. 18, 2005, 10 pages.

* cited by examiner

AUTO-SERVO TAPE SYSTEM AND ASSOCIATED RECORDING HEAD

CROSS-REFERENCE TO RELATED APPLICATIONS

This application is a Continuation of U.S. Ser. No. 11/084,412, filed Mar. 18, 2005, which is hereby incorporated by reference in its entirety for all purposes.

BACKGROUND OF THE INVENTION

1. Field of the Invention

The present invention generally relates to storage devices, and more particularly to servo systems for compensating for lateral tape motion.

2. Related Art

Increased data storage capacity and retrieval performance are desired of all commercially viable mass storage devices and media. In the case of linear tape recording, a popular trend is toward multi-head, multi-channel head structures with narrowed recording gaps and data track widths, so that many linear data tracks may be laid on a tape medium of a predetermined width, such as one-half inch width tape. To increase the storage density for a given cartridge size, the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including tape slitting variations, tension variations, imperfections in the guiding mechanism, friction variations, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities, and thus higher user data capacity. In order to maintain proper alignment of the head with the storage tape and data tracks on the tape, the tape is generally mechanically constrained to minimize LTM and data retrieval errors. Mis-registration between the head and data tracks can cause data errors during readback, and data loss on adjacent tracks during writing.

Various techniques for increasing the track density on magnetic tape employ recording and maintaining servo information on the tape to provide positioning information to a tape drive system during writing and/or reading processes. Some systems magnetically prerecord a continuous track of servo information which is then read and used as a position reference signal. For example, a variety of techniques have been used including dedicated, embedded magnetic servo tracks, time and amplitude magnetic servo tracks, and the like. One disadvantage of prewritten servo tracks is that the use of a separate servo track writer introduces errors into the system, reducing the ability to obtain the smallest track width.

SUMMARY OF THE INVENTION

According to a head positioning servo method of an embodiment of the invention, a head assembly includes a first head having first and second write elements, and a read element. The method comprises the first write element writing a first data track, and the second write element writing a first reference track. The first reference track partially overwrites the first data track to form a first servo edge for laterally servoing the head assembly.

The second write element may write the first reference track while the first write element writes the first data track. The first reference track may comprise an erasure. Alternatively, the first data track may comprise a first tone at a first frequency, and the reference track a second tone at a second frequency. After moving the first head toward the first servo edge, the read element may read information from the reference and first data tracks on both sides of the first servo edge to servo the head assembly.

The first head may be moved to a next data track position for writing. According to one embodiment, however, the first write element may not write while the head is servoing. If, on the other hand, the head is not servoing, then the first write element may write the next data track, which may partially overwrite the first data track to trim the first data track.

In an alternative embodiment, the head may write the next data track while servoing off the servo edge from the previous track. In that case, the head temporarily inhibits writing of the next data track to create at least one servo gap and the read element servos off the first servo edge in the at least one servo gap to servo the head assembly.

The data track width may be based upon the lateral gap between the read element and the second write element plus a portion of the lateral width of the read element overlapping the first reference track when the head is properly positioned with respect to a next data track. Using the servo method of an embodiment of the invention, data track widths of less than 6 microns, or even 1.0 micron, may be achieved.

According to another embodiment of the invention, a recording head comprises a first tape-head contact area including a first write element and a first read element, which itself may include an MR sensor element. The first read element is laterally offset as to the first write element, and no portion of the first read element lies in a region laterally overlapped by the first write element. A second tape-head contact area includes a second write element and a second read element, which also may include an MR sensor element. The second read element is laterally offset as to the second write element, and no portion of the second read element lies in a region laterally overlapped by the second write element.

The first read and write elements of the first tape-head contact area are aligned with the second write and read elements of the second tape-head contact area so that an end portion of the second write element lies in a region that laterally overlaps only an end portion of the first write element, the second read element lies in a region that longitudinally trails the first write element as to a first direction in which the first write element writes a first data track, and that is laterally overlapped fully by the first write element, and the first read element lies in a region that longitudinally trails the second write element as to a second direction opposite the first direction, and that is laterally overlapped fully by the second write element.

The second write element is operable to write a first reference track that partially overwrites the first data track to create a reference edge while the first write element writes the first data track. The lateral offset between the second read and write elements is based upon a width of the first data track less a portion of the lateral width of the second read element overlapping the first reference track when the head is properly positioned with respect to a next data track. The head is operable to write the first data track on magnetic tape so that the first data track width is less than 1.0 micron, and may be even less than 0.6 microns.

DETAILED DESCRIPTION OF THE INVENTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Figure 1:
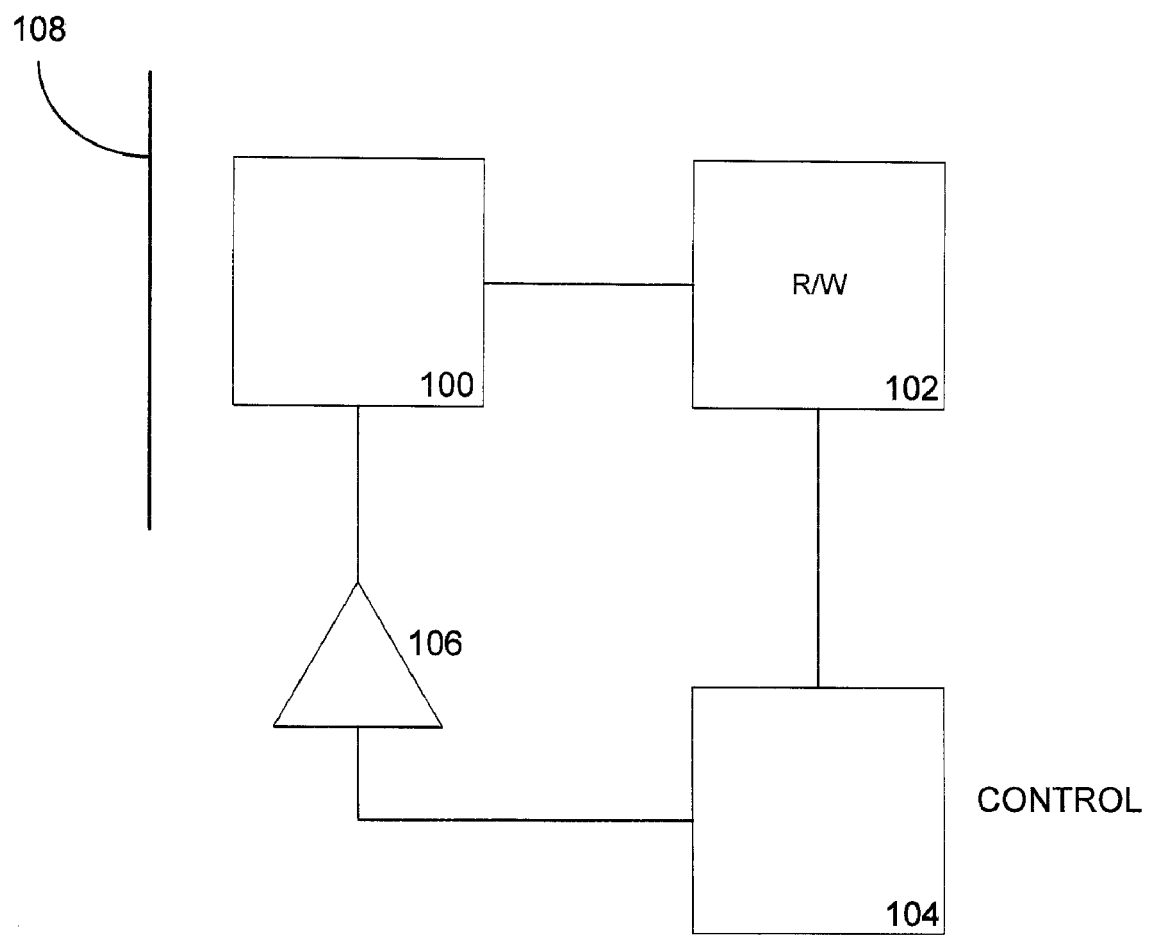
FIG. 1 illustrates a system according to an embodiment of the present invention.

FIG. 1 illustrates a servo system according to an embodiment of the present invention, which may be implemented in a media drive, such as a tape drive, for example. The system includes a read/write head assembly 100 according to an embodiment of the invention, read/write electronics 102 for respectively reading and writing signals from and to the head assembly, a controller 104, and a positioning actuator 106 for laterally moving the head assembly. Those skilled in the art will recognize that the controller may be implemented in firmware, software and/or associated hardware. (Note that for purposes of this application, the term "head assembly" denotes merely a ganged assembly of recording heads, and does not necessarily include or exclude other components.)

Auto Servoing

Through the read/write electronics 102, the controller 104 reads the signals output from the head assembly 100 reading a tape 108 located in a carrier, such as a cartridge or a cassette. Based upon the read signals, the controller 104, executing a servo algorithm according to an embodiment of the invention, determines the position of the head assembly 100. The position may be represented by a position error signal (PES). The controller 104 uses the PES to instruct the actuator 106 to adjust the lateral position of the head assembly.

Figure 2:
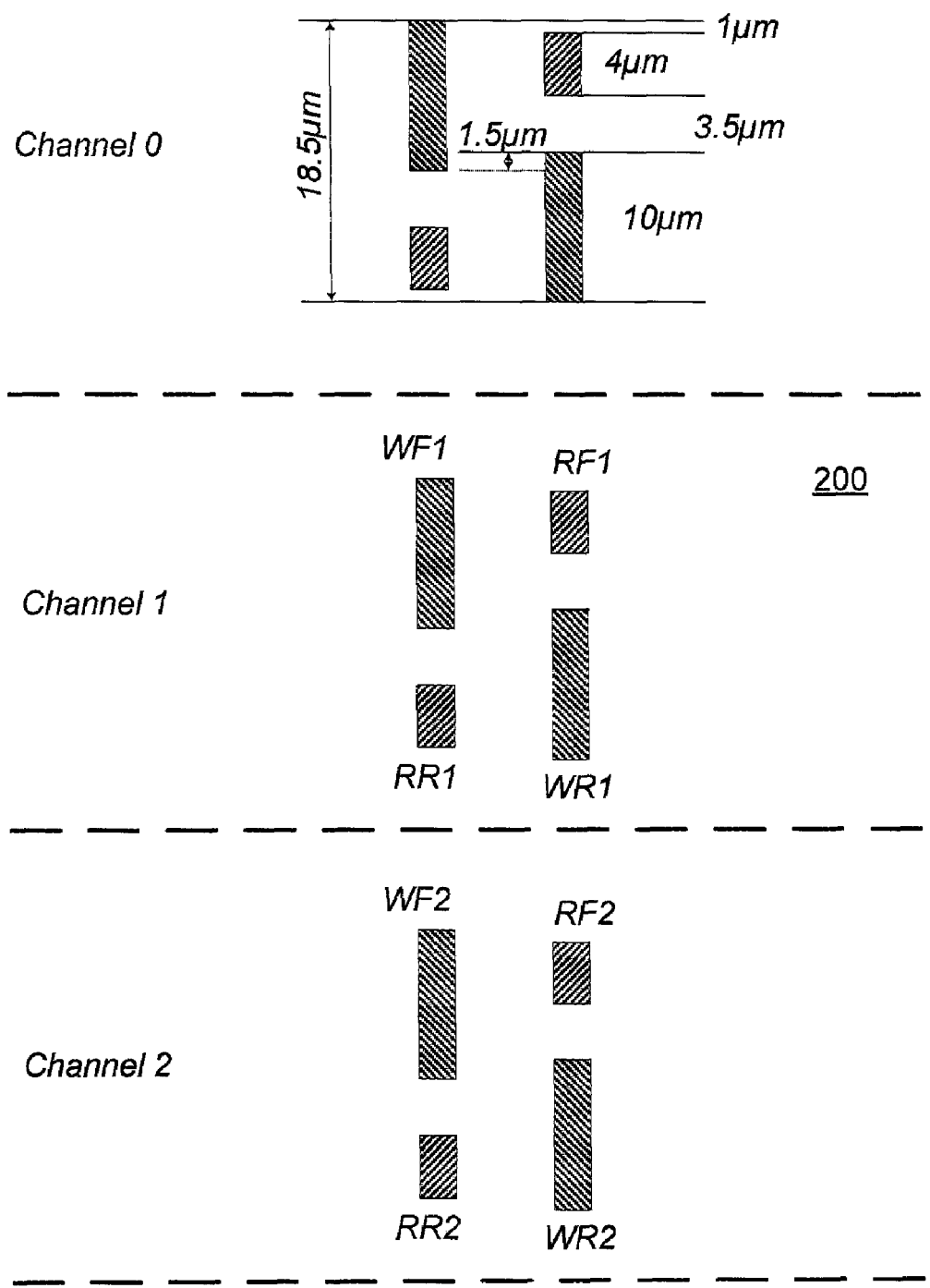
FIG. 2 illustrates recording heads according to an embodiment of the present invention.

FIG. 2 illustrates an example of three recording heads ganged together as the first three heads of a head assembly according to an embodiment of the invention. Each head 200 includes complementary pairs of forward and reverse read and write elements (transducers). In one embodiment, the head assembly includes 16 heads.

Here, assume that the forward direction of the tape denotes the tape moving from left to right. In a linear tape drive, the tape typically is written its full length in one direction. Subsequently, the head moves laterally to another track, the direction is reversed, and the tape is again written its full length, creating a serpentine pattern.

According to one format, physical tracks may be grouped according to bands, channels and logical tracks. A physical track is the area transversed on the tape medium by a recording head at a particular lateral position. Physical tracks laterally adjacent to each other and traversed by the same recording head at different lateral positions within a band are identified as being associated with the same "channel." (For the sake of convenience, we will also refer herein to a head operating within a band as a "channel.") For example, multiple physical tracks written by one head in the same direction may be laterally adjacent to each other as a group, followed by another set of physical tracks associated with another channel. A head can continue to step laterally to write physical tracks within a band, but stops before it reaches a track written by the next adjacent head in the head assembly, to avoid overwriting the track written by the next adjacent head. The group of physical tracks associated with a channel corresponds to a "logical track." Unless otherwise indicated herein, any reference to "track" herein refers to a physical track. All the physical tracks traversed in one direction by all recording heads in a head assembly represent a "band."

When the tape is moving in the forward direction during a normal write operation, a forward read element (or "reader") (e.g., RF1) trails behind a forward write element (or "writer") (e.g., WF1) to verify the data written by the forward writer. Conversely, when the tape moves in the reverse direction, a reverse reader (e.g., RR1) trails behind the reverse writer (e.g., WR1) to verify the data.

Assume that the tracks are numbered in descending order from top to bottom according to the embodiment of FIG. 2, so that the first track (track 0) written by a particular head lies above the next track (track 1). According to this frame of reference, the forward reader shown in the figure lies laterally directly above the reverse writer. Those skilled in the art will recognize that the forward reader may lie anywhere in a region laterally above the reverse writer. More generally, those skilled in the art will recognize that the forward reader lies in a region laterally trailing behind the reverse writer with respect to the lateral direction in which the head travels to servo using the servo edge created by the intersection of the data track and the reference track. An end portion of the reverse writer lies in a region that laterally overlaps an end portion of the forward writer within the head.

The forward reader and the reverse writer together are formed during manufacture on the same substrate using known photolithographic techniques for manufacturing thin film recording heads.

Figure 3:
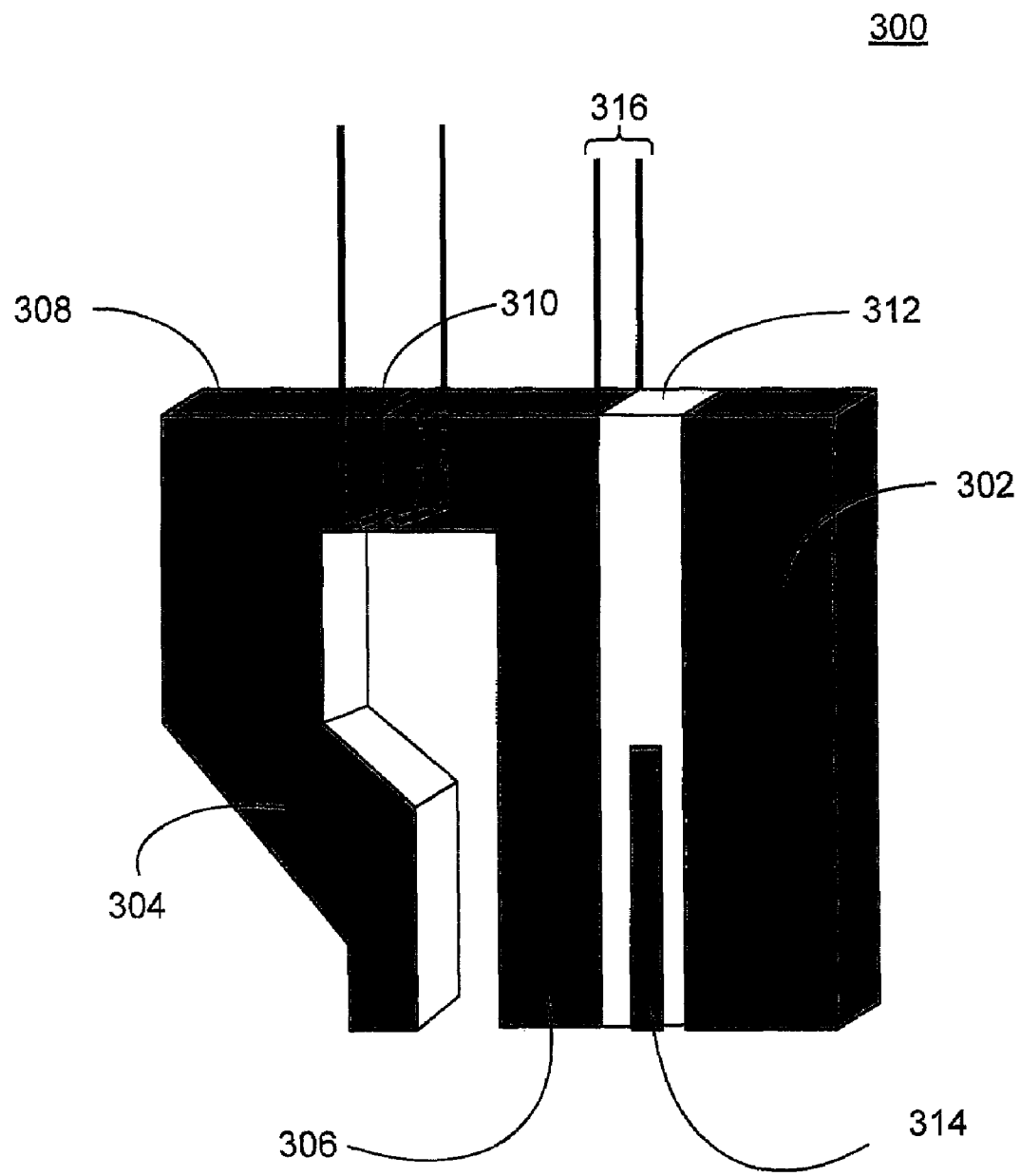
FIG. 3 is a schematic diagram illustrating an MR read/write set according to an embodiment of the present invention.

FIG. 3 is a schematic diagram of an example of a magnetoresistive ("MR") read/write set ("R/W set") 300 according to an embodiment of the invention. The R/W set 300 includes a bottom shield 302, a top pole 304, and a shared write pole/shield 306 made of magnetic material. A connecting arm magnetic circuit 308 is integrally formed with and connects the shared shield 306 and the top pole 304. The top pole 304, connecting arm 308 and shared shield 306 together form a write element. A write coil 310 is also formed using commonly known thin-film head manufacturing technology.

An insulator is formed between the shared shield and the bottom shield to form a first read gap 312. An MR read element 314 is located in the first read gap 312. Electrical contact is made to the MR read element 314 through two leads 316.

Figure 4:
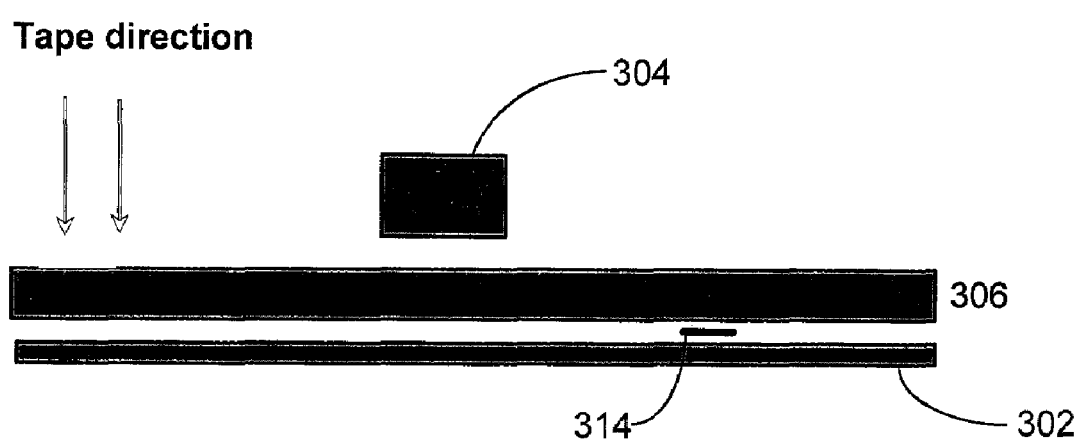
FIG. 4 illustrates a view of a tape bearing surface of the MR read/write set of FIG. 3.

FIG. 4 illustrates a view of the tape bearing surface of the R/W set of FIG. 3. The R/W set has been reoriented in the figure so that the tape is moving in a vertical direction on the page. According to an embodiment of the invention, the MR read element 314 is laterally offset as to the top pole 304 of the write element, and no portion of the read element lies in a region laterally overlapped by the top pole of the write element.

The write element is laterally wider than the read element. Note that the width of the write element is the same as that of the top pole. The shared shield 306 is at least as wide as the sum of the lateral widths of the MR read element 314, the write element 304 and the lateral offset between the MR read element 314 and the write element 304, in order to reduce stray magnetic fields. The bottom shield 302 is at least as wide as the shared shield to reduce stray magnetic fields, as well.

Figure 5A:
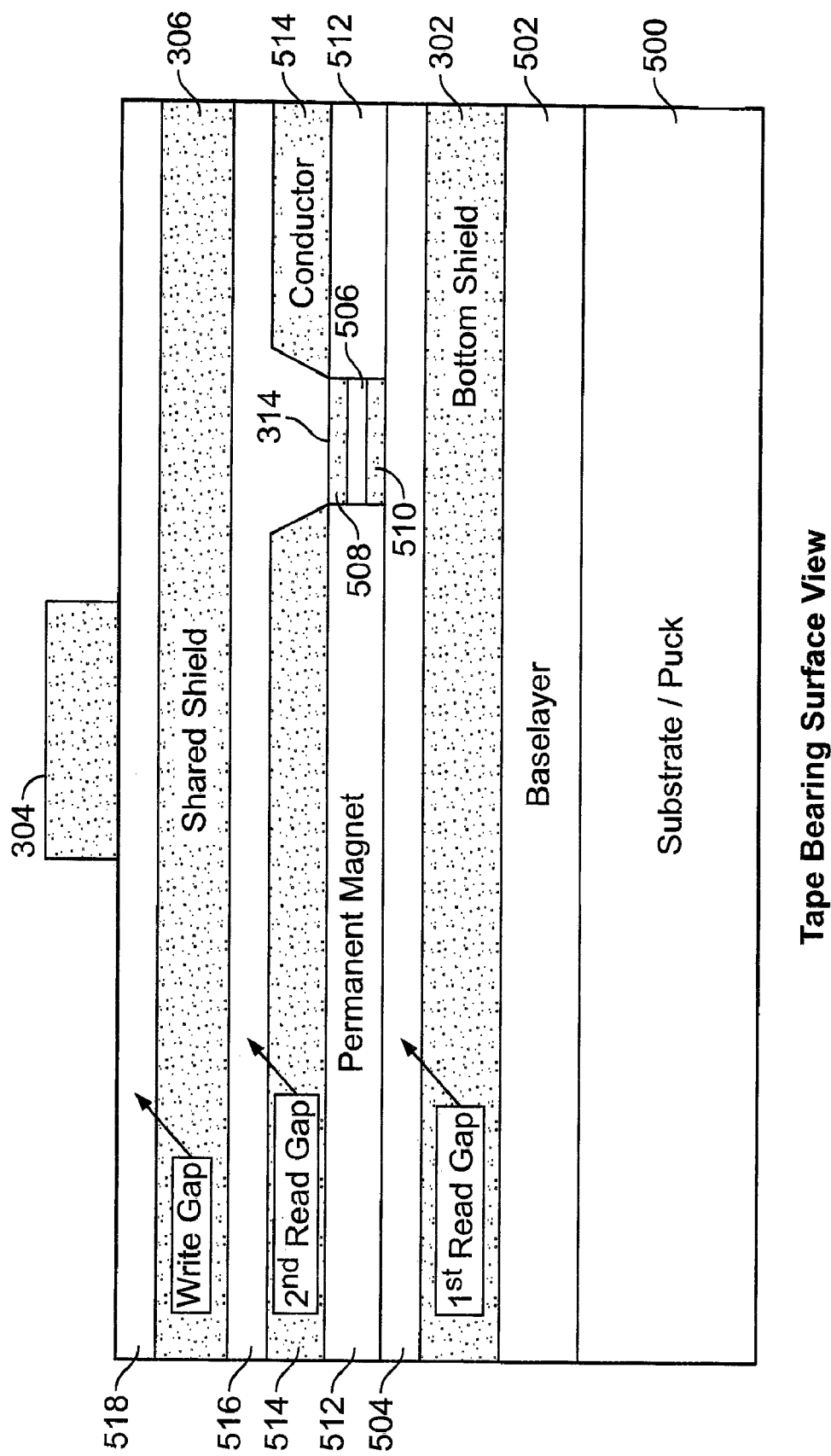
FIG. 5A illustrates the manufacture of the MR read/write set of FIG. 4 according to an embodiment of the present invention.

The R/W set of the embodiment shown in FIGS. 3 and 4 may be formed using standard photolithographic techniques for manufacturing thin film MR heads. FIG. 5A illustrates the process of manufacturing the R/W set of FIG. 4. As is known in the art, a R/W set may be typically formed on or within a tape-to-head (or "tape-head") contact area, such as a bump or island, where the tape to head contact is accomplished. Although the examples herein refer to "bumps," those skilled in the art will recognize that the invention applies to a tape-head contact area, whether or not raised or indented, or actually in physical contact with the tape medium.

The R/W set may be formed on a ALTC substrate or other appropriate material "puck" 500, upon which is deposited a base layer 502. The bottom shield 302 is deposited on the base layer 502 over the substrate 500. An insulator is deposited on the bottom shield to form a first read gap 504. The MR read element 314 is formed on the first read gap 504 using standard photolithographic/masking techniques.

As an example, the MR read element 314 includes an MR sensor (such as NiFe or similar material 508), an insulative spacer 506, and a reference magnetic material 510, such as SAL. Permanent magnets 512 are formed on both sides of the MR read element 314. Conductors 514 are formed over the permanent magnets 512 to provide the leads for sensing electrical changes in the MR read element as it passes over magnetic tape. The effective width of the MR read element is determined by the width of the MR sensor.

An insulator is deposited over the MR read element 314 to form a second read gap 516. The shared shield 306 is formed over the second read gap 516, followed by a non-magnetic write gap 518. The top pole 304 is formed over the write gap 518 and the write coil and the connecting arm (not shown), and encapsulated using standard techniques.

Referring to FIG. 5A, the masks used to form the MR read element 314 are laterally offset a predetermined distance from the center of the bottom shield to form an offset MR read element 314. The mask used to form the top pole is centered over the shared shield. The top pole is wider than the MR read element 314.

Figure 5B:
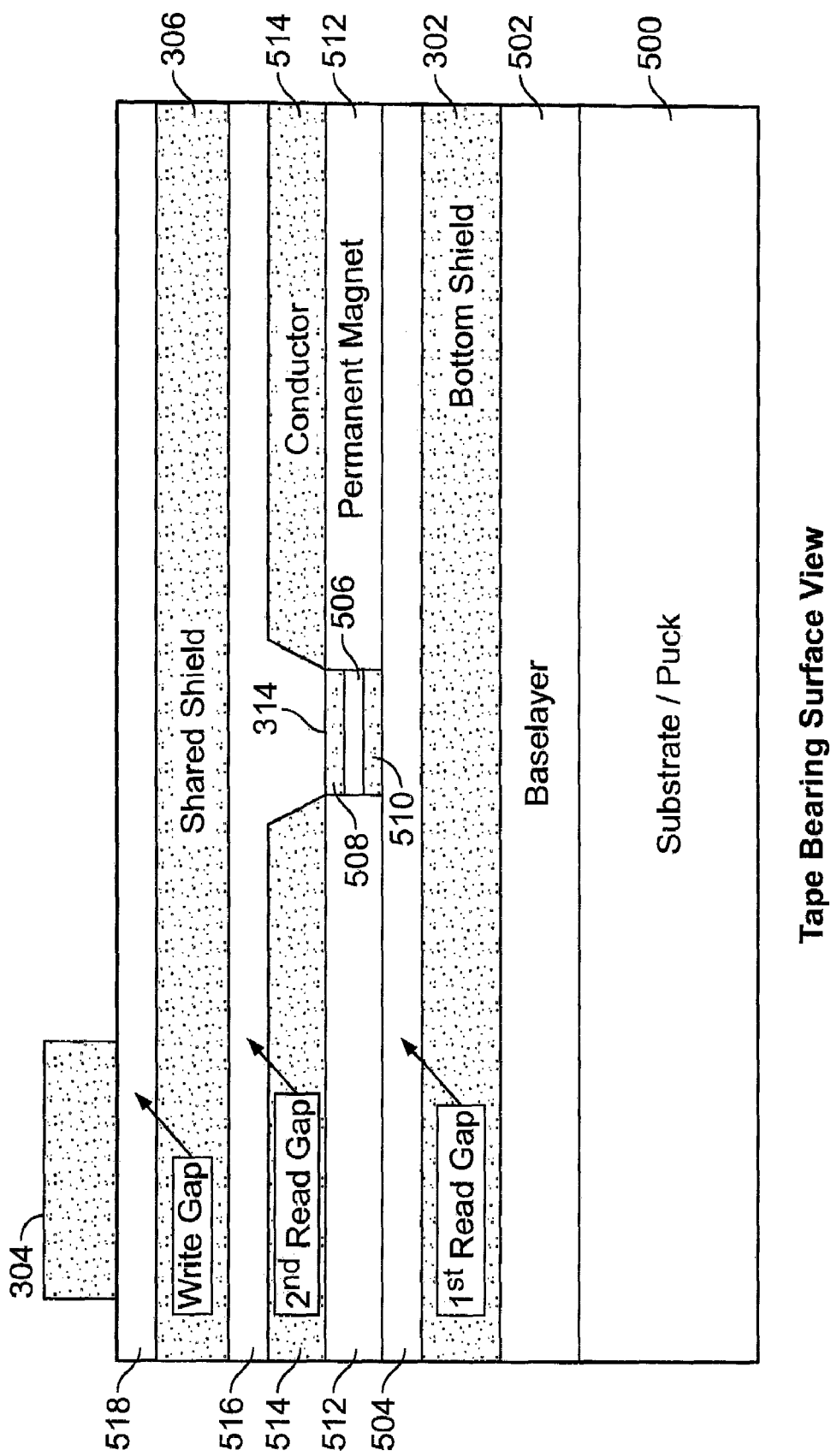
FIG. 5B illustrates the manufacture of an alternative embodiment of the MR read/write set of FIG. 4 according to an embodiment of the present invention.

Referring to FIG. 5B, according to another embodiment of the invention, the MR read element 314 is centered as to the bottom shield, and the mask used to form the top pole is laterally offset from the MR read element by a given distance. Those skilled in the art will recognize that the read and write elements may be laterally placed in many different regions to accomplish the desired offset.

At a predetermined distance away from the tape bearing surface, the connecting arm is formed in the longitudinal direction between the top pole and the shared shield. The connecting arm passes through the write coil. (The connecting arm and write coil are not shown in this figure.)

To form a head that can be used for read after write verification, a second bump including a complementary R/W set is aligned with the first bump on the substrate. As shown in FIG. 2, the first bump may be treated as including the forward reader and the reverse writer, whereas the second bump includes the reverse reader and the forward writer. The bumps are aligned so that an end portion of the reverse writer lies in a region that laterally overlaps only an end portion of the forward writer, the forward reader lies in a region laterally overlapped fully by the forward writer, and the reverse reader lies in a region laterally overlapped fully by the reverse writer.

Forming the reverse (forward) writer used to form the servo edge on the same bump as the forward (reverse) reader used to read the servo edge allows a very high precision in the gap between the "lateral" read/write element pairs. According to one embodiment, each write element may be 10 microns long, and each read element 4 microns. The overlap between the end portions of the write elements may be 1.5 microns, and the gap between the read and write elements on the same island may be 3.5 microns. As will be seen below, this precision translates to precise placement of extraordinarily narrow tracks according to the invention.

The auto-servo system of an embodiment of the invention allows either continuous, dedicated servoing or sampled servoing. One or more tracks may be dedicated for continuous servoing. In an example described herein, adjacent channels 0 and 1 are alternately used for continuous servoing. Those skilled in the art will recognize, however, that heads in any location, such as at opposite ends of the head assembly, may be used for continuous servoing.

Figure 6:
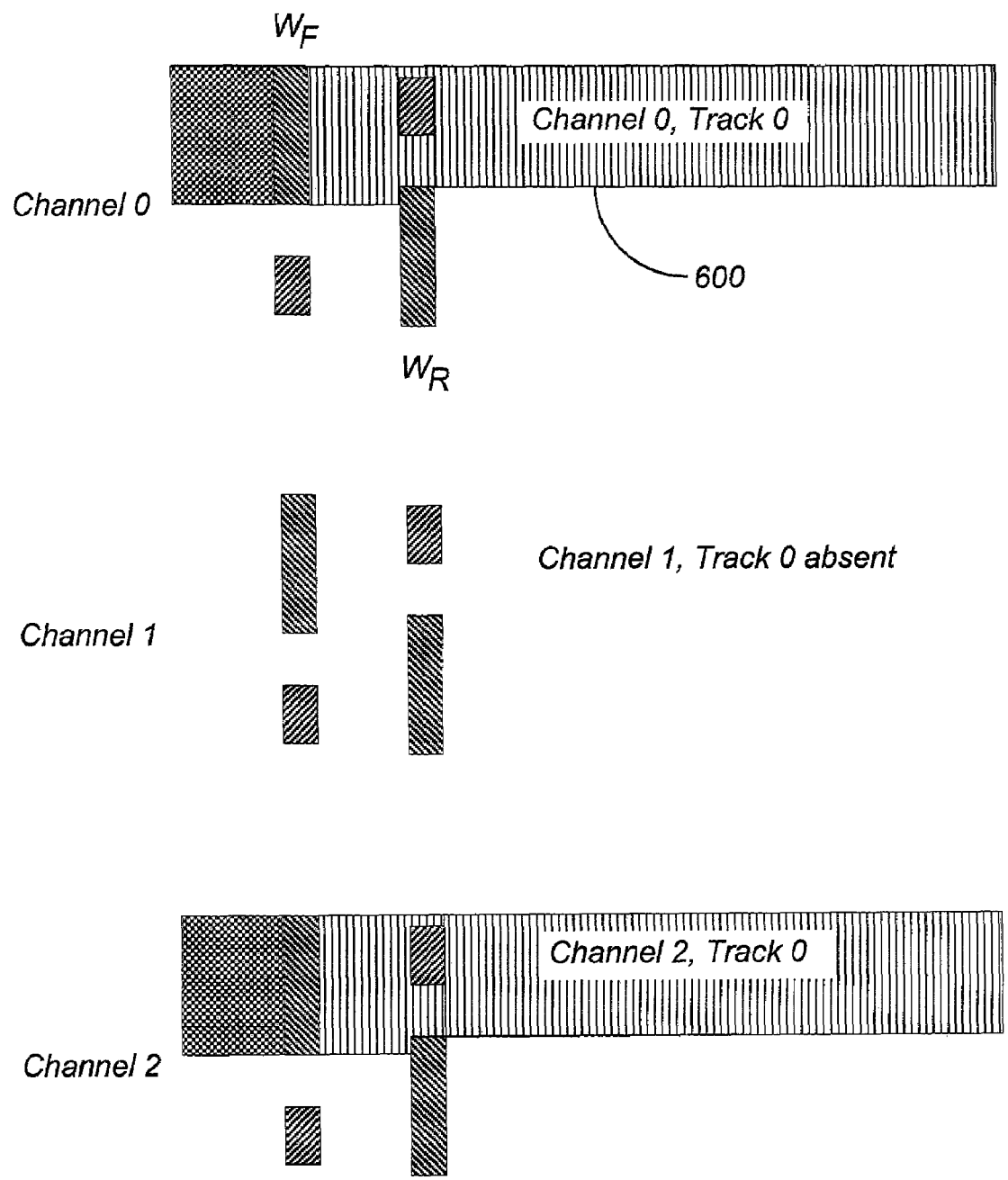
FIGS. 6-8 illustrate the writing of multiple tracks according to a continuous servo embodiment of the present invention.
Figure 7:
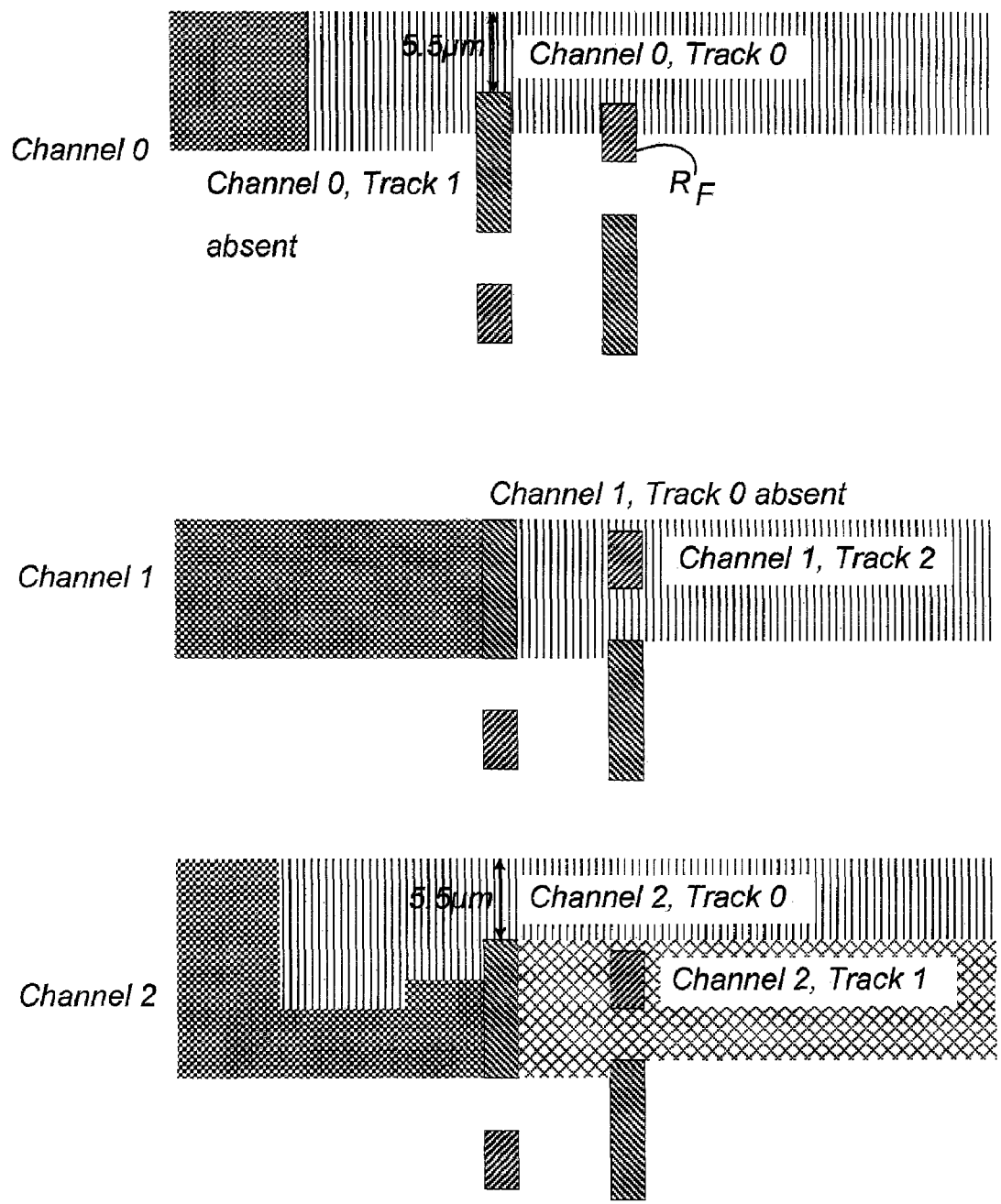
Figure 8:
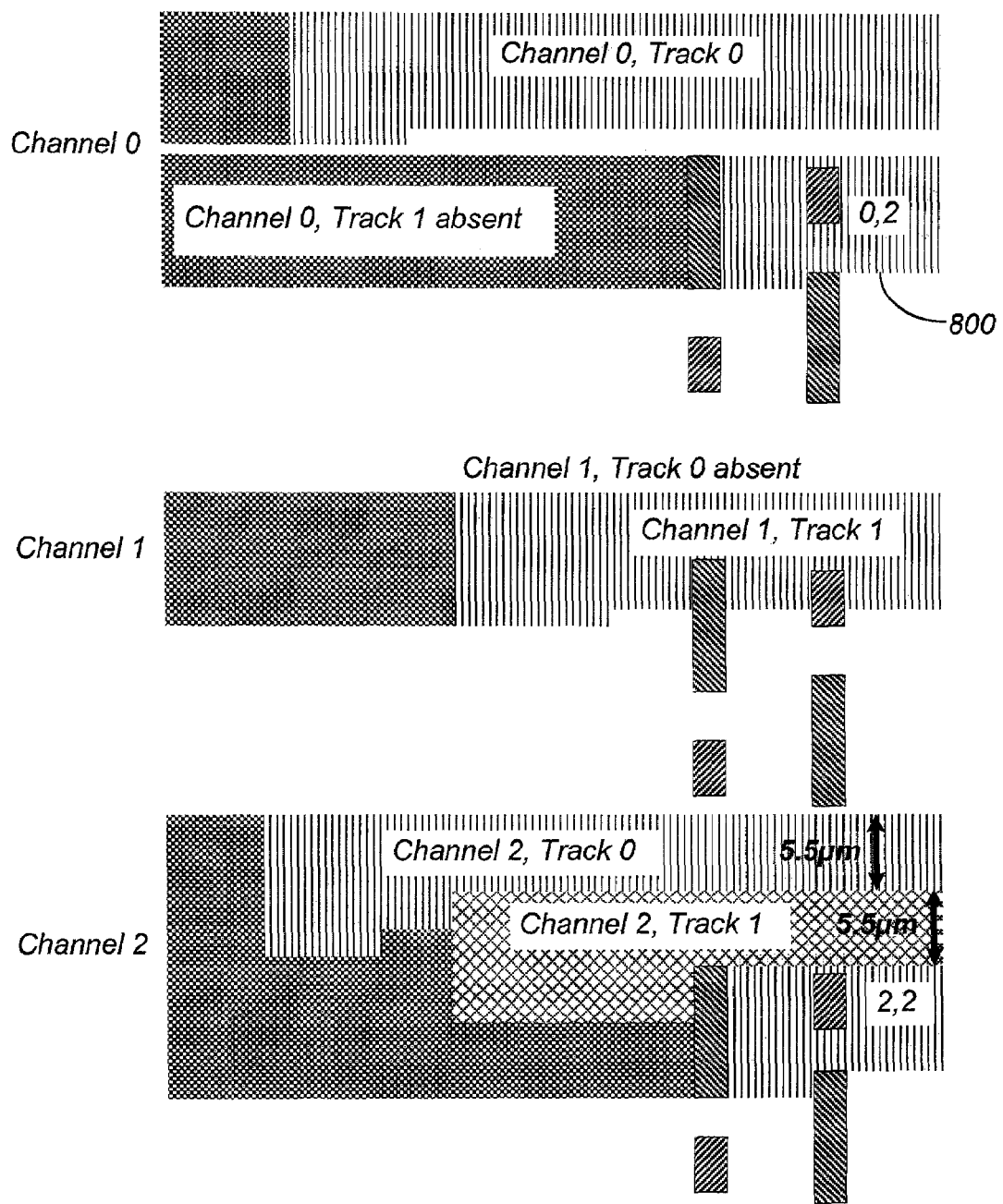

FIGS. 6-8 illustrate the read and write functions performed by a head implementing an example of an auto-servo algorithm according to a continuous servo embodiment of the invention. Referring to FIG. 6 and focusing on the first head (i.e., channel 0) for now, during a first pass the forward writer $W_F$ writes data to a data track (track 0). The first pass may be written open loop. Alternatively, the lateral position of the head assembly during the first pass may be controlled by servoing off the edge of the tape with an optical mask or by using other techniques, such as those described in "MASKED POSITION SENSORS AND CONTROL SYSTEMS," application Ser. No. 10/942,678, filed Sep. 15, 2004 (the "'678 application"), and "DIFFRACTIVE POSITION SENSORS AND CONTROL SYSTEMS," application Ser. No. 10/927,732, filed Aug. 27, 2004 (the "'732 application"), assigned to the assignee of the present invention, and incorporated by reference in their entirety herein.

In conventional tape drives, the reverse writer is not used during forward writing. According to an embodiment of the invention, however, the reverse writer $W_R$ writes a reference track during the forward pass. The reverse writer may, for example, write a simple DC erase signal or a signal at a preset frequency, such as 0-10 KHz. As a result, the reverse writer trims the first data track. As will be seen below, the intersection between the reference track and the data track forms a reference edge (otherwise denoted herein as a "servo edge") 600 used to laterally position the head assembly during subsequent passes.

Using coarse positioning as is known in the art (or as described in the '678 or '732 applications), for the next pass the controller causes the actuator to step the head assembly laterally to the next track position (e.g., track 1) within a given coarse tolerance. Referring to FIG. 7, this places the forward reader RF of channel 0 in the vicinity of the servo edge. The system may be calibrated so that a predetermined portion of the forward reader reads from the reference track (and a complementary portion reads from the data track) when the head assembly is properly positioned with respect to the data tracks.

For example, the forward reader may be calibrated so that it reads 50% from the reference track and 50% from the data track when properly positioned. During the first pass when the forward writer writes data, the forward reader fully overlaps the first data track. The resulting signal can be used as a calibration reference indicating 100% overlap. During the next (current) pass, if the reference track was created using a DC erase signal, then the amplitude of the read signal may be correlated directly with the degree of overlap. Thus, 50% overlap may be indicated by reading a signal that is 50% of the full amplitude associated with a 100% overlap. The degree of overlap indicates the lateral position of the forward reader, and thus the position of the entire head assembly.

As an alternative, the servo may use a dual frequency technique. In this case, the forward writer writes to the data track a first tone of a predetermined first frequency along with the data. The first tone is selected so as not to interfere with the data. For continuous servoing, the first tone may be written throughout the data over the entire track, whereas for sampled servoing, the first tone need only be written in the tape locations that are sampled for servoing. The reverse writer writes a second tone of a predetermined second frequency to the reference track. The second frequency is selected to be low enough (e.g., 0-10 KHz) so as not to couple into the forward reader on the same island.

The forward reader reads both tones when overlapping the servo edge. The controller performs signal processing (e.g., filtering) to isolate the read tones, and determines the difference in their amplitudes to determine the forward reader position. Using the position measured (by either technique), the controller instructs the actuator to adjust the lateral position of the head assembly to the correct location.

If a particular head (e.g., channel 2) is not in servo mode, then it may be used to write the next data track (track 1) (upon which it is currently positioned in FIG. 7). When this happens, the forward writer of channel 2 partially overwrites the previous data track (track 0) to trim the width of the previous track (to, e.g., 5.5 microns). As part of this process, the next data track completely overwrites the servo edge written during the previous track. From the writing of a track and the next adjacent track, one can see that the resulting track width is equal to the lateral gap between the forward read element and the reverse write element plus a portion of the lateral length of the forward read element that would overlap the corresponding reference track if the head were properly positioned with respect to the next data track. Please note that, in the claims, references to the width of a data track are to the width of a data track not used for servoing (in the dedicated servo mode), e.g., channel 2 in this example, that results after writing the next adjacent track.

Holding other factors constant, to implement the auto-servo algorithm to achieve a given track width, the lateral offset between the read and write elements may be chosen as the ultimate data track width (after trimming by both the reverse writer and the forward writer writing the next data track) less the portion of the lateral width of the forward read element overlapping the reference track when the head is properly positioned with respect to the next data track. Viewed another way, if other factors are predetermined, then the lateral width of the forward writer may be chosen as the sum of the ultimate data track width, the lateral offset between the forward reader and the reverse writer, and the portion of the lateral width of the forward reader overlapping the reference track when the head is properly positioned with respect to the next data track.

Using this technique and current head manufacturing capabilities, a head according to an embodiment of the invention can write trimmed data tracks as narrow as 1.0 micron, or less, such as 0.55 micron. The current state of the art in thin film head manufacturing, in combination with the auto-servo algorithm of the invention, can support, for example, a 0.55 micron track width using the following dimensions: forward (and reverse) write element length=1.0 micron; forward read element length=0.4 micron; gap between reverse write element and forward read element=0.35 micron; and percentage of the lateral length of the forward read element that would overlap the corresponding reference track if the head were properly positioned with respect to the next data track=50%.

Referring to FIG. 7, the channel 0 head described above (denoted the "first head" for the sake of convenience) may be used for servoing off of its corresponding servo edge during the entire pass of the head assembly in one direction. Referring to FIG. 8, on the next pass in the same direction, another head (denoted the "second head" for the sake of convenience) located anywhere else in the head assembly (channel 1 in this example) may servo off its corresponding servo edge. (It is implicit that the tape is rewound between passes in the same direction.)

By having the channel 0 head freed from servoing during this pass, it may write data to track 2. During the next pass (not shown), the channel 0 head servos off the servo edge 800 created during the previous pass (shown in FIG. 5), while the channel 1 head is free to write data to track 3 (not shown). Note that, to create consecutive servo edges, the two servoing channels in this example behave differently than the other channels. Specifically, to prevent overwriting of their servo edges, channel 0 does not write odd-numbered tracks, and channel 1 does not write even-numbered tracks. Channels 2-15 (in a 16-head head assembly) write both odd and even tracks.

During continuous servoing, when the controller employs the forward reader of a head (e.g., channel 0) for servoing, the head that includes the servoing reader does not write data. During a normal data write operation in the forward direction, the forward reader is used to verify the data written by the forward writer. During continuous servoing, the forward reader cannot perform this function. Nevertheless, other heads in the head assembly (e.g., channels 1 and 2) can perform normal read-verified write operations while the head that employs its reader for servoing helps servo the entire head assembly.

Figure 9A:
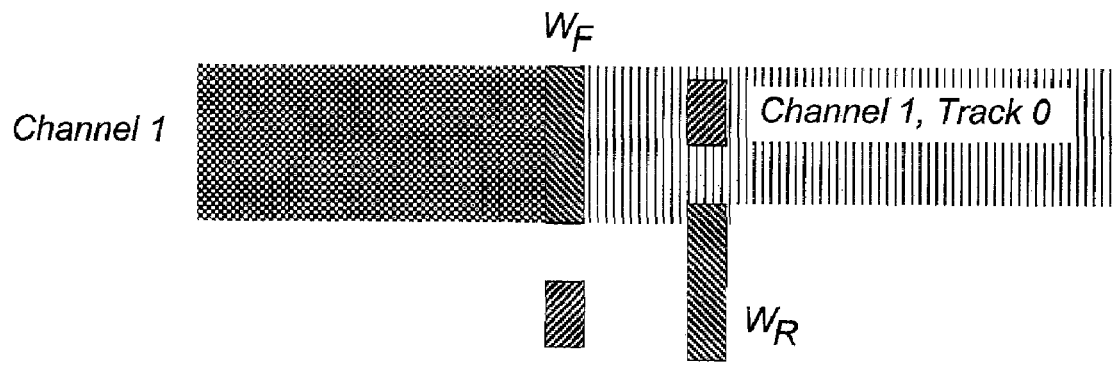
FIGS. 9A and B illustrate sampled servoing during a gap between data blocks according to an embodiment of the present invention.

FIGS. 9A and B illustrate an example of two passes of a recording head positioned for sampled servoing during a gap between data blocks. (In the figure, the head width relative to the gap width is exaggerated for illustrative purposes.) In actuality, the servo gap is much larger than the read element longitudinal width. Those skilled in the art will also recognize that, although the figure only illustrates one servo gap for one channel, in practice the algorithm of an embodiment of the invention would likely employ many servo gaps dispersed over the tape length. Moreover, more than one channel may include servo gaps for sampled servoing. As with the continuous servo algorithm, heads in any location, such at opposite ends of the head assembly, may be used for sampled servoing.

Figure 9B:
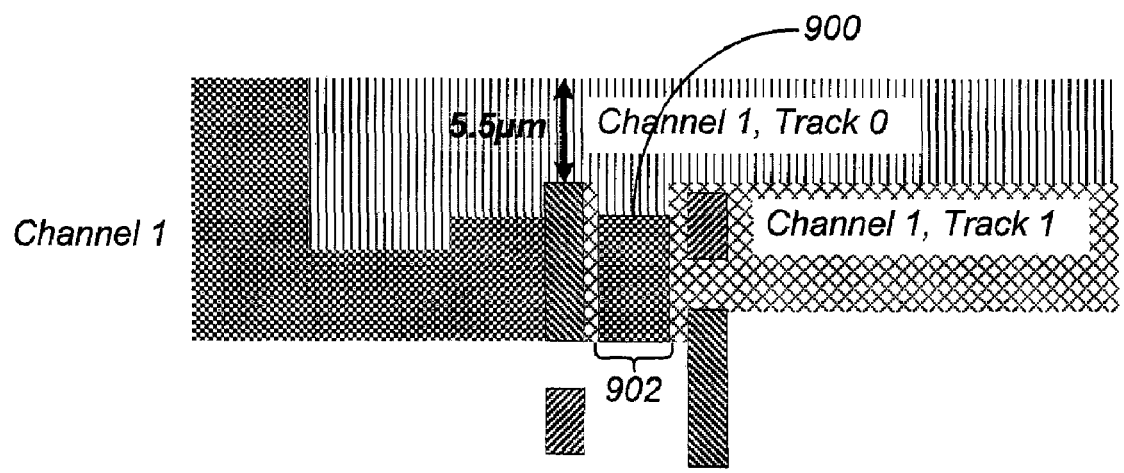

Using the sampled servo method, the data is written in blocks by the forward writer, separated by gaps. According to an embodiment of the invention, the controller inhibits the forward writer $W_F$ (e.g., of the head associated with channel 1 in this example) from writing (e.g., track 1) during a predetermined time period, as shown in FIG. 9B. The resulting "servo" gap 900 includes the data previously written by the forward writer during the previous pass (shown in FIG. 9A), while writing track 0, which was trimmed by the reverse writer $W_R$ to create a servo edge 902. Using the dual frequency technique, during the writing of track 0 the forward writer wrote a first tone and the reverse writer wrote a second tone, which is also exposed in the gap associated with track 1. Thus, the forward reader may servo off the servo edge 902 exposed in the gap using the dual frequency method. Of course, the sampled servo technique may also be used in the case that the forward writer only writes regular data and the reverse writer creates an erased reference track.

When the forward reader reaches the servo gap, the controller uses the reader for servoing. At that time, unlike the continuous servo method, the forward writer can write data, and the forward reader can verify the data after it exits the gap and reaches the newly written data. The forward writers for the other heads in the assembly may also be active to write data when a head is servoing. Alternatively, more than one head, or even all heads, in the head assembly may be employed for servoing during the gaps occurring in their respective tracks. (Please note that the gap used for servoing in one track is typically not necessarily longitudinally aligned with the servo gaps in other tracks.)

Another advantage of the sampled servo technique over continuous servoing is that, instead of alternating heads, the same head may be used for servoing at all times. Because no two heads can be perfectly matched in structure, positioning and impedance, among other factors, the differences in the characteristics of the alternating heads introduces some error into the continuous servoing process and the limitation of the number of dedicated heads redundancy, on the other hand, the sampled servo method avoids any such differential error. The continuous servo technique also detracts from data capacity because of the use of dedicated heads.

During sampled servoing, the controller should avoid conventional, non-servo gaps that result from the usual recording of data blocks onto tape. These non-servo gaps will not include the servo edge used for servoing by the invention. Also, the servoing head must avoid servoing off of servo gaps created during a previous pass on an adjacent track. We will refer to both types of gaps as "invalid gaps." Using known desynchronization techniques (e.g., by controlling timing and/or spatial frequency of the gaps), the controller of an embodiment of the invention controls the placement of the (valid) servo gaps to avoid these invalid gaps.

By writing the servo edge during normal write operations, the present invention avoids the use of a separate servo writer that would introduce errors into the servo process. Further, by using the same heads to write the servo edge as regular data, the invention allows for a close correlation between the servo edge and the actual data tracks. Moreover, by trimming the tracks using the reverse writer, which is on the same substrate as the forward reader, and by using the forward writer itself when writing the next track, the present invention allows for precise placement of very narrow tracks.

One skilled in the art will recognize that the most recently written servo edge may be used for servoing during a read operation by any head in the assembly. In other words, while the forward reader servos off its corresponding servo edge to servo the head assembly, a forward reader of another head in the assembly may perform a normal read operation.

Write Position Verification

The recording head of an embodiment of the invention may be employed not just for servoing, but for other functions, as well. As noted above for the sampled servo write algorithm, during the servo gap the read element may read the servo edge of the previous track. Instead of using the head for servoing, however, the head may be used to accurately verify its position where it is servoed using other techniques, e.g., magnetic or optical.

Using conventional servoing, lateral head position is typically determined by a surrogate for the head, e.g., the location of optical tracks on the back of the tape. The servo edge created by the head of the invention, however, provides a direct reference to the actual head position. In some instances, a conventional head servoed by traditional means may wander off track due to, for example, an error in the optical servo tracks on the back of the tape, or a servo writing error. This may happen in conjunction with successful read after write verification because the reader does not track head position. As a result, a conventionally servoed writer may overwrite existing tracks.

Using the head of the invention, the head creates a reference edge, as before, during the writing of a data track. During the writing of a next adjacent track, the head inhibits writing during predetermined periods to create a "reference gap." Within the reference gap the head may attempt to read the reference edge. The controller will know what signal types and quality to expect while the read element is within the gap. For example, the head may attempt to read the first and second tones using the dual frequency technique. If, however, the controller does not receive the expected signal at a predetermined threshold quality, then that condition may indicate that the head is off course by an unacceptable amount, possibly leading to the danger of overwriting adjacent tracks. In that case, the controller may inhibit writing of the next data block. Presumably, the servo mechanism, e.g., the optical servo, would correct course after a predetermined delay, e.g., by the time the data block after the skipped block is to be written. Thus, the controller may instruct the head to resume writing after the delay.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with a particular embodiment, one skilled in the art would recognize that various features of the described embodiments may be combined in accordance with the invention.

Moreover, it will be appreciated that various modifications and alterations may be made by those skilled in the art without departing from the spirit and scope of the invention. For example, those skilled in the art will recognize that, although the invention has been described in the context of tape moving in the forward direction, the invention is equally applicable (using the complementary set of read and write elements) to tape moving in the reverse direction. If the same head configuration as that described herein is used in the reverse direction, then the algorithm of the invention would write tracks in a lateral direction opposite that described herein, e.g., track 1 would be above, not below, track 0. In general, while servo writing, the head must move laterally in the direction of the newly created servo edge. Moreover, although the servo control algorithm of an embodiment of the invention was described using a particular head configuration, those skilled in the art will recognize that the algorithm may be practiced with other head configurations. Further, although the invention has generally been described in the context of a linear tape drive, it is not to be so limited. The invention is not to be limited by the foregoing illustrative details, but is to be defined according to the claims.

What is claimed is:

1. A head positioning servo method for non-azimuthal recording, wherein a head assembly includes a first head having first and second write elements and a read element, the method comprising:

writing a first data track with the first write element; and writing a first reference track with the second write element, wherein the first reference track is written while the first write element writes the first data track and the first reference track partially overwrites the first data track to form a first servo edge for laterally servoing the head assembly, wherein the head assembly further includes a second head including corresponding first and second write elements and a read element, the read element of the second head for servoing off a second servo edge formed by data and reference tracks respectively written by the first and second write elements of the second head; and the read element of the second head servoing off of the second servo edge to laterally position the head assembly while the first head writes the first data track.

2. The method of claim 1, wherein the first head alternates with the second head to servo off of its corresponding servo edge while the other head writes data to a corresponding data track.

* * * * *